(12) United States Patent
    Fukuyasu

(10) Patent No.: US 12,260,491 B2
(45) Date of Patent: Mar. 25, 2025

(54) INFORMATION PROCESSING DEVICE, INFORMATION PROCESSING METHOD, VIDEO DISTRIBUTION METHOD, AND INFORMATION PROCESSING SYSTEM

(71) Applicant: Sony Group Corporation, Tokyo (JP)

(72) Inventor: Tetsuya Fukuyasu, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 131 days.

(21) Appl. No.: 18/014,249

(22) PCT Filed: Jul. 15, 2021

(86) PCT No.: PCT/JP2021/026587
§ 371 (c)(1),
(2) Date: Jan. 3, 2023

(87) PCT Pub. No.: WO2022/024780
PCT Pub. Date: Feb. 3, 2022

(65) Prior Publication Data
US 2023/0260199 A1    Aug. 17, 2023

(30) Foreign Application Priority Data

Jul. 30, 2020    (JP) .................................. 2020-129414
Aug. 6, 2020    (JP) .................................. 2020-133615

(51) Int. Cl.
*G06T 15/20*    (2011.01)
*G06T 15/04*    (2011.01)
(Continued)

(52) U.S. Cl.
CPC .............. *G06T 15/20* (2013.01); *G06T 15/04* (2013.01); *G06T 17/00* (2013.01); *H04N 21/8146* (2013.01)

(58) Field of Classification Search
CPC ......... G06T 15/20; G06T 15/04; G06T 17/00; H04N 21/8146
See application file for complete search history.

(56) References Cited

U.S. PATENT DOCUMENTS

2010/0134516 A1*  6/2010  Cooper ................... G06T 15/04
                                                           345/592
2015/0249815 A1*  9/2015  Sandrew ................. G06T 17/00
                                                           348/47
(Continued)

FOREIGN PATENT DOCUMENTS

EP          3343914 A1      7/2018
JP        2018-049591 A     3/2018
(Continued)

*Primary Examiner* — Terrell M Robinson
(74) *Attorney, Agent, or Firm* — Paratus Law Group, PLLC

(57) ABSTRACT

There is provided an information processing device to generate a video to which a wide range of renditions are applied from a three-dimensional object generated by a volumetric technology. The information processing device includes a first generation unit (134) that generates, based on a three-dimensional model of a subject generated by using a plurality of captured images obtained by imaging the subject and based on a two-dimensional image, a video in which a subject generated from the three-dimensional model, and the two-dimensional image, are simultaneously present.

17 Claims, 10 Drawing Sheets

(51) Int. Cl.
*G06T 17/00* (2006.01)
*H04N 21/81* (2011.01)

(56) References Cited

U.S. PATENT DOCUMENTS

| 2018/0268570 A1* | 9/2018 | Budagavi | G06T 9/001 |
| 2019/0182470 A1 | 6/2019 | Mizuno | |
| 2021/0029342 A1* | 1/2021 | Ito | H04N 23/60 |
| 2024/0155094 A1* | 5/2024 | Ruhm | H04N 13/167 |

FOREIGN PATENT DOCUMENTS

| JP | 2019-106617 A | 6/2019 | |
| WO | WO 2017/082076 A1 | 5/2017 | |
| WO | WO-2017191701 A1 * | 11/2017 | G06F 3/0481 |
| WO | WO 2019/021375 A1 | 1/2019 | |

* cited by examiner

INFORMATION PROCESSING DEVICE, INFORMATION PROCESSING METHOD, VIDEO DISTRIBUTION METHOD, AND INFORMATION PROCESSING SYSTEM

CROSS REFERENCE TO PRIOR APPLICATION

This application is a National Stage Patent Application of PCT International Patent Application No. PCT/JP2021/026587 (filed on Jul. 15, 2021) under 35 U.S.C. § 371, which claims priority to Japanese Patent Application Nos. 2020-129414 (filed on Jul. 30, 2020) and 2020-133615 (filed on Aug. 6, 2020), which are all hereby incorporated by reference in their entirety.

FIELD

The present disclosure relates to an information processing device, an information processing method, video distribution method, and an information processing system.

BACKGROUND

There has been a proposed technology of volumetric technology (also referred to as volumetric capture technique) of using a plurality of cameras arranged to surround a subject (object) to reconstruct a three-dimensional shape of the subject (object) inside and perform redrawing the shape from a free viewpoint. By arranging the camera so as to capture the back surface and the top of the head by this volumetric technology, it is possible to generate a video (volumetric video) that enables the viewer to view the subject in all directions.

CITATION LIST

Patent Literature

Patent Literature 1: WO 2019/021375 A

SUMMARY

Technical Problem

In a typical case of viewing the video, a user will watch the video generated by superimposing a three-dimensional object generated by the volumetric technology on a background object created in advance and rendering the combined objects. However, there is a problem that, simply by superimposing a background object on a three-dimensional object, it is not possible to achieve renditions suitable for each of a wide variety of video content such as a music live show, a sports event, a lecture, and an academic class.

Therefore, the present disclosure proposes an information processing device, an information processing method, a video distribution method, and an information processing system that enable generation of a video having a wide range of renditions from a three-dimensional object generated by a volumetric technology or the like.

Solution to Problem

To solve the problems described above, an information processing device according to an embodiment of the present disclosure includes a first generation unit that performs, based on a three-dimensional model of a subject generated by using a plurality of captured images obtained by imaging the subject and based on a two-dimensional image, generation of a video in which the subject generated from the three-dimensional model, and the two-dimensional image, are simultaneously present.

DESCRIPTION OF EMBODIMENTS

Figure 1:
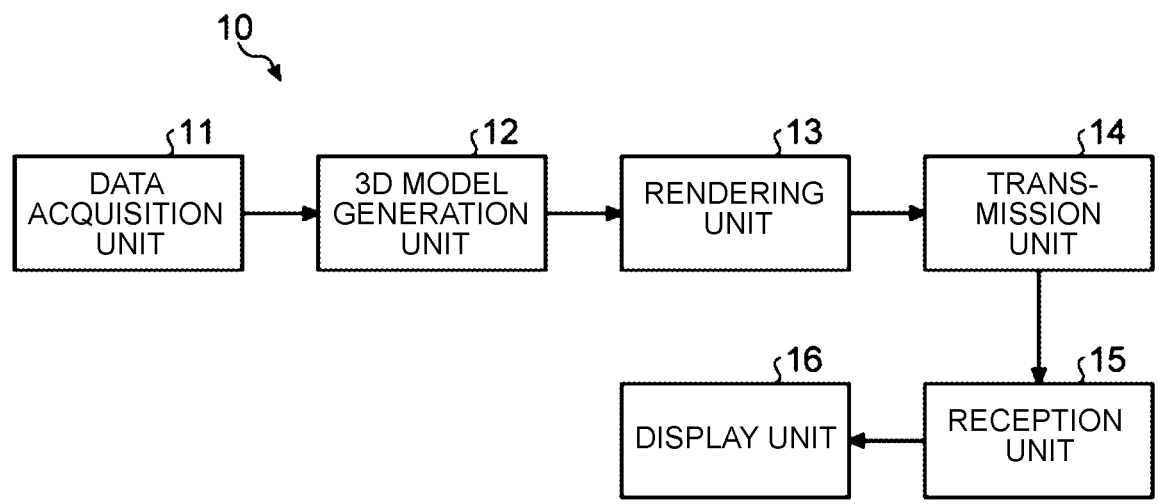
FIG. 1 is a block diagram illustrating a schematic configuration of an information processing system according to one embodiment of the present disclosure.

Embodiments of the present disclosure will be described below in detail with reference to the drawings. In each of the following embodiments, the same parts are denoted by the same reference numerals, and a repetitive description thereof will be omitted.

The present disclosure will be described in the following order.
0. Introduction
1. One embodiment
 1-1. Functional configuration of information processing system
 1-2. Flow of processing performed by information processing system 1-3. Hardware configuration of information processing system
1-4. Further details of present embodiment
1-4-1. Further detailed configuration example of rendering unit
1-4-2. Specific example of intermediate rendering video
1-4-3. Further detailed configuration example of initial virtual viewpoint video generation unit 131
1-4-4. Further detailed configuration example of final virtual viewpoint video generation unit 134
1-5. Examples of renditions according to present embodiment
1-6. Specific example of information processing system
1-7. Summary

0. Introduction

The volumetric technology is a technique that uses a plurality of cameras arrayed to surround a subject (object) to reconstruct a three-dimensional shape of the subject (object) inside and perform redrawing the shape from a free viewpoint. By arranging the cameras so as to capture the back surface and the top of the head, the viewer can view the subject in all directions. Since various types of processing such as capture, modeling, and rendering in such a volumetric technology require a huge calculation cost and a long processing time, the processing is usually supposed to be performed offline. However, with a capability to execute various types of processing in the volumetric technology online in real time, it is possible to immediately generate a volumetric video from the captured three-dimensional object and distribute the generated video to the user. This leads to a demand, in use cases where real-time performance is highly important, such as a music live show, a sports event, a lecture, and an academic class, to execute various types of processing in the volumetric technology in real time. Incidentally, a volumetric video may be, for example, a video generated by using a 3D object generated by the volumetric technology.

Real-time execution of various types of processing in the volumetric technology can be implemented by utilizing a high performance computing (HPC) technology used for large-scale processing in a supercomputer or a data center, for example.

Furthermore, as described above, in a typical case of viewing of a volumetric video, one views a volumetric video generated by superimposing a 3D object generated by the volumetric technology on a background object created in advance. However, it is not always possible to achieve renditions suitable for each of a wide variety of video content such as a music live show, a sports event, a lecture, and an academic class simply by superimposing a background object on a 3D object.

To handle this issue, the following embodiment makes it possible to generate a video to which a wide range of renditions are applied from a three-dimensional object generated by a volumetric technology.

In addition, when generation of a volumetric video is to be executed by a limited resource such as one personal computer (hereinafter, referred to as PC), for example, processing cannot catch up with captured video data, leading to the possibility of impairment of real-time performance. In particular, incorporating various types of additional processing such as superimposition of another 3D object, image quality enhancement, various effects, or the like in the volumetric technology would increase the overall processing load, making it difficult to ensure real-time property.

Moreover, since every PC has its suitable job of processing depending on the specifications, aggregating various types of processing of the volumetric technology in one PC might lower the development efficiency. For example, there might be a case where a PC having Linux (registered trademark) installed can perform low-latency distributed processing by which each of processing is distributed to a plurality of graphics processing units (GPUs) (hereinafter, referred to as GPU distributed processing) on one hand, the PC has few necessary libraries of processing resulting in poor development efficiency on the other hand.

Therefore, in the following embodiment, various types of processing in the volumetric technology are distributed to a plurality of computers, thereby enabling quick generation of a volumetric video. For example, it is possible to generate a volumetric video ensuring real-time property. In addition, distributing the processing to a plurality of computers will improve the degree of freedom of the development environment of the system, making it possible to build a system that has suppressed deterioration in development efficiency.

However, even in a case where processing is distributed to a plurality of computers, there can be a problem of increased latency unless a transmission method with a small transfer volume is used. Therefore, in the following embodiment, a data transmission method between computers with a small transfer volume will also be described with an example.

1. One Embodiment

1-1. Functional Configuration of Information Processing System

First, an outline of an information processing system according to one embodiment of the present disclosure will be described with reference to FIG. 1. FIG. 1 is a block diagram illustrating a schematic configuration of an information processing system of the present embodiment.

As illustrated in FIG. 1, an information processing system 10 includes a data acquisition unit 11, a 3D model generation unit 12, a rendering unit 13, a transmission unit 14, a reception unit 15, and a display unit 16. Note that the display unit 16 need not be included in the information processing system 10.

(Data Acquisition Unit 11)

Figure 2:
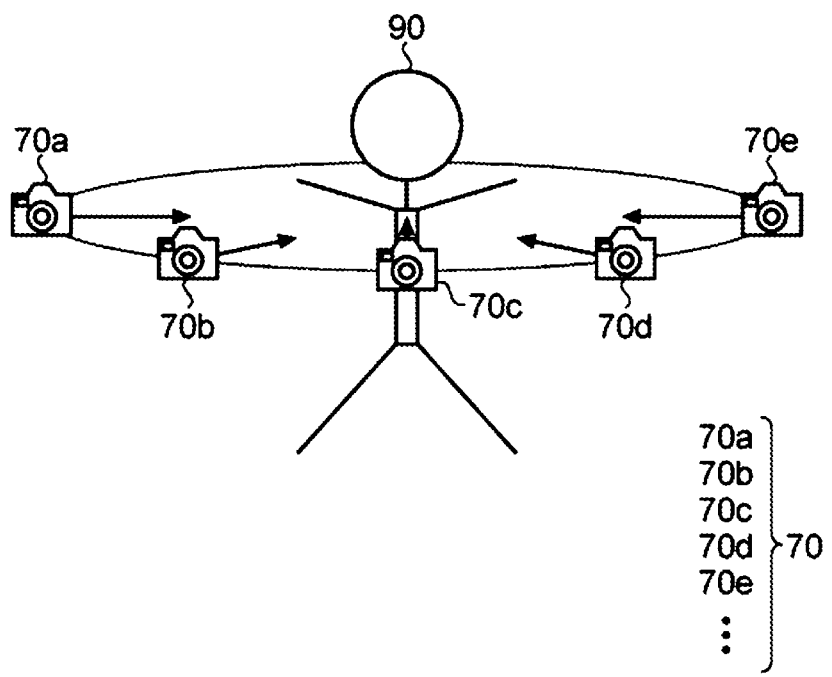
FIG. 2 is a diagram illustrating an example of an imaging device according to the present embodiment.

The data acquisition unit 11 acquires image data for generating a three-dimensional model of a subject 90 which is an imaging target object (hereinafter, referred to as a real camera image). (Note that the image data in the present description can also include video data such as a moving image). For example, as illustrated in FIG. 2, a plurality of viewpoint images captured by a plurality of real cameras 70a, 70b, 70c, 70d, 70e, . . . (hereinafter, the real cameras 70a, 70b, 70c, 70d, 70e, . . . are also collectively referred to as a real camera 70) arranged to surround the subject 90 are acquired as real camera images. In this case, the plurality of viewpoint images is preferably images captured in synchronization by the plurality of real cameras 70. Furthermore, for example, the data acquisition unit 11 may acquire a plurality of real camera images from different viewpoints by moving one real camera 70 and imaging the subject 90 from a plurality of viewpoints. However, the present invention is not limited thereto, and the data acquisition unit 11 may acquire one real camera image of the subject 90. In this case, the 3D model generation unit 12 to be described below may generate a three-dimensional model of the subject 90 based on one real camera image using machine learning, for example.

Note that the data acquisition unit 11 may perform calibration based on the real camera image and acquire internal parameters and external parameters of each real camera 70. Furthermore, the data acquisition unit 11 may acquire, for example, a plurality of pieces of depth information indicating a distance from a plurality of viewpoints to the subject 90.

(3D Model Generation Unit 12)

The 3D model generation unit 12 generates a three-dimensional model having three-dimensional information of the subject based on a real camera image for generating a three-dimensional model of the subject 90. For example, the 3D model generation unit 12 may generate a three-dimensional model of the subject by sculpturing the three-dimensional shape of the subject based on images from a plurality of viewpoints (for example, silhouette images from a plurality of viewpoints) using a technique referred to as visual hull. In this case, the 3D model generation unit 12 can further perform high accuracy transformation on the three-dimensional model generated with Visual Hull, by using a plurality of pieces of depth information indicating distances from viewpoints at a plurality of locations to the subject. Furthermore, as described above, the 3D model generation unit 12 may generate the three-dimensional model of the subject 90 from one real camera image of the subject 90.

The three-dimensional model generated by the 3D model generation unit 12 can also be defined as a moving image of the three-dimensional model in that the model is generated in time series in units of frames. Furthermore, the three-dimensional model is generated using the real camera image acquired by the real camera 70, and thus can be defined as a live three-dimensional model. The three-dimensional model may be formed to have shape information indicating the surface shape of the subject 90 expressed in the form of three-dimensional shape mesh data, referred to as polygon mesh, which is expressed by connections between vertices. The three-dimensional shape mesh data includes, for example, three-dimensional coordinates of vertices of a mesh and index information indicating which vertices are to be combined to form a triangular mesh. Note that the method of expressing the three-dimensional model is not limited thereto, and the three-dimensional model may be described by a technique referred to as a point cloud expression method of expressing by the position information formed of points.

The pieces of three-dimensional shape mesh data can be associated with information regarding colors and patterns as textures (also referred to as texture images). Texture association includes a view independent texture method in which the color is not changed in any viewing direction and a view dependent texture method in which the color changes depending on the viewing direction. In the present embodiment, one or both of these may be adopted, and other texture methods may be adopted.

(Rendering Unit 13)

For example, the rendering unit 13 projects three-dimensional shape mesh data of the three-dimensional model at a drawing camera viewpoint (corresponding to a virtual viewpoint to be described below), and performs texture mapping of applying a texture representing a color or a pattern of the mesh on the projected mesh shape, thereby generating a volumetric video of the three-dimensional model. Since the viewpoint at this time is a freely set viewpoint regardless of the camera position at the time of imaging, the viewpoint is also referred to as a virtual viewpoint in the present embodiment.

The texture mapping includes methods such as a view dependent method (VD method) in consideration of the viewing viewpoint of the user and a view independent method (VI method) not in consideration of the viewing viewpoint of the user. The VD method changes the texture to be applied to the three-dimensional model in accordance with the position of the viewing viewpoint, and thus has an advantage of successfully achieving rendering with higher quality compared to the VI method. On the other hand, the VI method does not take the viewpoint position in viewing into consideration, and thus has an advantage of needing less processing volume compared to the VD method. Note that the viewpoint data for viewing may be obtained such that a user's viewing position (region of interest) is detected by a user side display device (also referred to as a user terminal) and then input from the user terminal to the rendering unit 13.

Furthermore, it is allowable to adopt, in the rendering unit 13, for example, a billboard rendering method in which an object is rendered so as to be able to maintain a vertical posture of the object with respect to the viewpoint in the viewing. For example, when rendering a plurality of objects, it is allowable to adopt the billboard rendering method to objects of low interest to the viewer, while adopting another rendering method to other objects.

Furthermore, the rendering unit 13 appropriately applies various types of processing, such as addition of a shadow, image quality enhancement, and effects, on the generated volumetric video to generate video content to be finally distributed to the user.

(Transmission Unit 14)

The transmission unit 14 transmits (distributes) a video stream of the video content output from the rendering unit 13 to one or more user terminals including the reception unit 15 and the display unit 16 via a predetermined network. The predetermined network may be various networks such as the Internet, a local area network (LAN) (including Wi-Fi or the like), a wide area network (WAN), and a mobile communication network (including Long Term Evolution (LTE), a fourth generation mobile communication system, a fifth generation mobile communication system, and the like).

(Reception Unit 15)

The reception unit 15 is provided in the user terminal described above, and receives the video content transmitted (distributed) from the transmission unit 14 via a predetermined network.

(Display Unit 16)

The display unit 16 is provided in the above-described user terminal, and displays the video content received by the reception unit 15 to the user. The user terminal may be, for example, an electronic device capable of viewing moving image content, such as a head mounted display, a spatial display, a television, a PC, a smartphone, a mobile phone, or a tablet terminal. Furthermore, the display unit 16 may be a 2D monitor or a 3D monitor.

Note that the information processing system 10 in FIG. 1 is illustrated to indicate a series of flow starting from the data acquisition unit 11, which acquires a captured image as a material of generating content, up to the display unit 16 which controls the user terminal used for viewing by the user. However, not all functional blocks are necessary for implementation of the present embodiment, and it is possible to implement the present embodiment for each functional block or a combination of a plurality of functional blocks. For example, the configuration illustrated in FIG. 1 is an exemplary case where the rendering unit 13 is disposed on the server side, the configuration is not limited to this case and the rendering unit 13 may be disposed on the user terminal side including the display unit 16. Furthermore, in a case where the 3D model generation unit 12 and the rendering unit 13 are disposed in mutual different servers (information processing devices) connected via a network, it is allowable to equip the server having the 3D model generation unit 12 with an encoding unit that compresses transmission data and equip the server having the rendering unit 13 with a decoding unit that decodes compressed data.

When the information processing system 10 is implemented, one same operator may implement all the processes, or different operators may implement the processes for each functional block or for each processing (step) to be described below. For example, a company X generates a piece of 3D content through the data acquisition unit 11 and the 3D model generation unit 12. There is also a case where implementation proceeds with a plurality of operators jointly working on the content so as to allow the 3D content to be distributed through a platform of a company Y and then operations such as rendering and display control of the 3D content are performed by an information processing device in a company Z.

In addition, each functional block described above can be implemented on a cloud. For example, the rendering unit 13 may be implemented on the user terminal side or may be implemented on the server side. In that case, information is exchanged between the user terminal and the server.

FIG. 1 collectively illustrates the data acquisition unit 11, the 3D model generation unit 12, the rendering unit 13, the transmission unit 14, the reception unit 15, and the display unit 16, as the information processing system 10. Alternatively, the information processing system 10 of the present specification can be defined flexibly, such that the system involving two or more functional blocks are to be referred to as an information processing system, or for example, two units out of the data acquisition unit 11, the 3D model generation unit 12, the rendering unit 13, and the transmission unit 14 can be collectively referred to as the information processing system 10 without including the reception unit 15 or the display unit 16.

1-2. Flow of Processing Performed by Information Processing System

Figure 3:
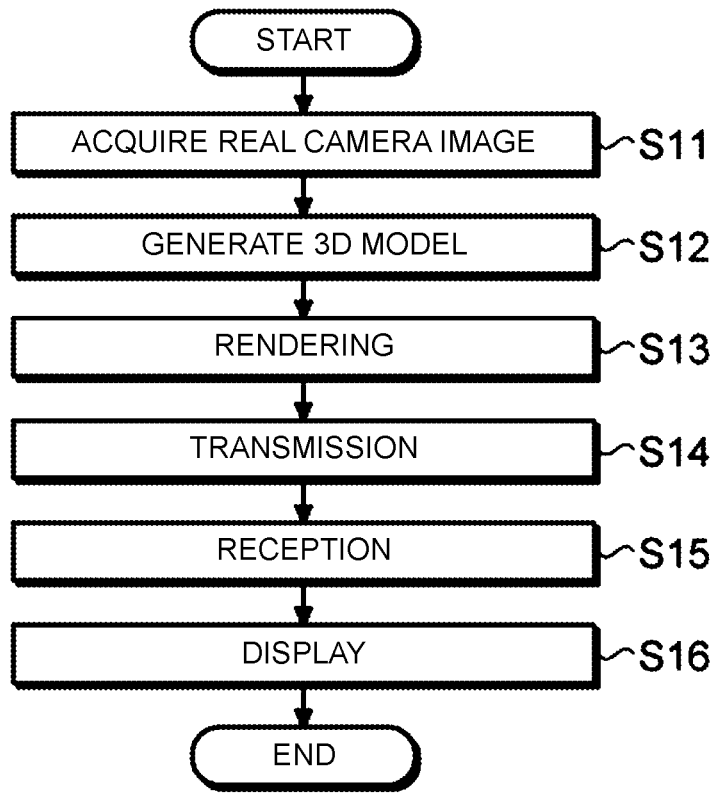
FIG. 3 is a flowchart illustrating an example of a flow of processing performed by the information processing system according to the present embodiment.

Next, a flow of processing performed by the information processing system 10 will be described with reference to FIG. 3. FIG. 3 is a flowchart illustrating an example of a flow of processing performed by the information processing system.

As illustrated in FIG. 3, the present operation is started when the data acquisition unit 11 acquires real camera images of a subject captured by a plurality of real cameras 70 (step S11).

Next, the 3D model generation unit 12 generates a three-dimensional model having three-dimensional information (three-dimensional shape mesh data and texture) of the subject based on the real camera image acquired in step S11 (step S12).

Next, the rendering unit 13 performs rendering of the three-dimensional model generated in step S12 based on the three-dimensional shape mesh data and the texture to generate a piece of video content to be presented to the user (step S13).

Next, the transmission unit 14 transmits (distributes) the video content generated in step S13 to the user terminal (Step S14).

Next, the reception unit 15 of the user terminal receives the video content transmitted from transmission unit 14 (step S15). Subsequently, the display unit 16 of the user terminal displays the video content received in step S15 to the user (step S16). Thereafter, the information processing system 10 ends the present operation.

1-3. Hardware Configuration of Information Processing System

Figure 4:
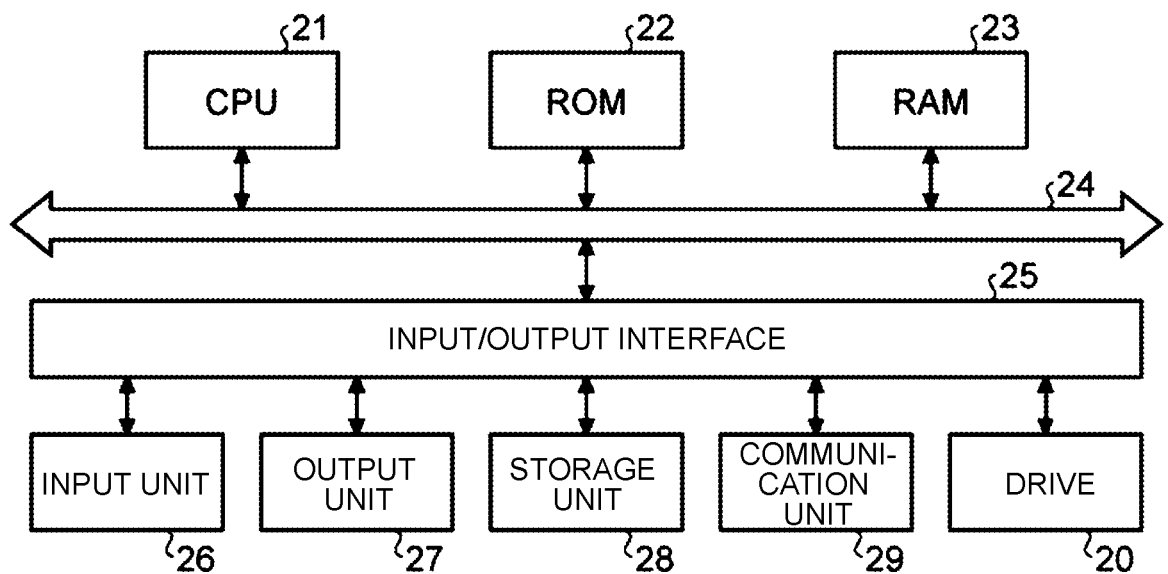
FIG. 4 is a block diagram illustrating an example of a hardware configuration of the information processing system according to the present embodiment.

Next, a hardware configuration of the information processing system 10 will be described with reference to FIG. 4. FIG. 4 is a hardware block diagram illustrating an example of a hardware configuration of the information processing system.

In FIG. 4, a CPU 21, ROM 22, and RAM 23 are interconnected via a bus 24. The bus 24 is also connected to an input/output interface 25. The input/output interface 25 is connected to an input unit 26, an output unit 27, a storage unit 28, a communication unit 29, and a drive 20.

The input unit 26 includes, for example, a keyboard, a mouse, a microphone, a touch panel, an input terminal, and the like. The output unit 27 includes, for example, a display, a speaker, an output terminal, and the like. The storage unit 28 includes, for example, a hard disk, a RAM disk, non-volatile memory, and the like. The communication unit 29 includes, for example, a network interface and the like. The drive 20 drives a removable medium such as a magnetic disk, an optical disk, a magneto-optical disk, or semiconductor memory.

In the computer configured as described above, for example, the CPU 21 loads a program stored in the storage unit 28 into the RAM 23 via the input/output interface 25 and the bus 24 and executes the program, whereby the above-described series of processing is performed. The RAM 23 also appropriately stores data and the like necessary for the CPU 21 to execute various types of processing.

The program executed by the computer can be applied, for example, by being recorded in a removable medium as a package medium or the like. In this case, by attaching the removable medium to the drive, the program can be installed in the storage unit 28 via the input/output interface.

Note that the program can also be provided via a wired or wireless transmission medium such as a local area network, the Internet, or digital satellite broadcasting. In this case, the program can be received by the communication unit 29 and installed in the storage unit 28.

1-4. Further Details of Present Embodiment

The overall schematic configuration example of the information processing system 10 has been described above. Hereinafter, a more detailed configuration example on the premise of the information processing system 10 described above will be described in detail with reference to the drawings.

1-4-1. Further Detailed Configuration Example of Rendering Unit

Figure 5:
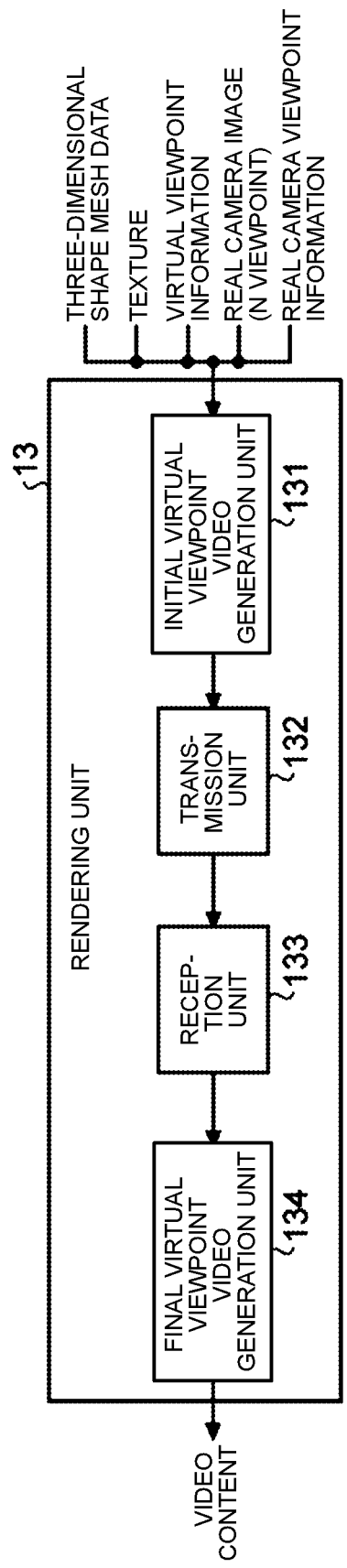
FIG. 5 is a block diagram illustrating a further detailed configuration example of a rendering unit according to the present embodiment.

FIG. 5 is a block diagram illustrating a further detailed configuration example of the rendering unit 13 according to the present embodiment. As illustrated in FIG. 5, the rendering unit 13 includes an initial virtual viewpoint video generation unit 131, a transmission unit 132, a reception unit 133, and a final virtual viewpoint video generation unit 134. Although FIG. 4 illustrates one final virtual viewpoint video generation unit 134, the rendering unit 13 may include a plurality of final virtual viewpoint video generation units 134.

The rendering unit 13 receives an input of the three-dimensional model (three-dimensional shape mesh data and texture) generated by the 3D model generation unit 12.

Furthermore, the rendering unit 13 also receives an input of information regarding a virtual viewpoint at the time of rendering the three-dimensional model (hereinafter, referred to as virtual viewpoint information). The virtual viewpoint information can include information indicating the position of a virtual viewpoint (hereinafter, referred to as a virtual viewpoint position) and information regarding a three-dimensional rotation matrix with respect to the reference position of the virtual viewpoint (hereinafter, referred to as virtual viewpoint rotation information).

Furthermore, the rendering unit 13 can also receive inputs of the real camera image acquired by any one or more of the real cameras 70 (hereinafter, at N viewpoints (N is an integer of 0 or more)), the viewpoint position of the real camera 70 of each of the N viewpoints (hereinafter, referred to as real camera viewpoint position), and information indicating a three-dimensional rotation matrix with respect to the reference position of the viewpoint position of the real camera 70 of each of the N viewpoints (hereinafter, referred to as real camera viewpoint rotation information). The real camera viewpoint position and the real camera viewpoint rotation information may be, for example, information included in an internal parameter and an external parameter obtained by calibration performed by the data acquisition unit 11, and these pieces of information are collectively referred to as real camera viewpoint information in the following description.

(Initial Virtual Viewpoint Video Generation Unit 131)

The initial virtual viewpoint video generation unit 131 renders a three-dimensional model from a virtual viewpoint based on the input three-dimensional shape mesh data, texture, and virtual viewpoint information, thereby generating a virtual viewpoint video. Subsequently, the initial virtual viewpoint video generation unit 131 uses the generated virtual viewpoint video to generate an intermediate rendering video to be transmitted to the final virtual viewpoint video generation unit 134. As described below, the intermediate rendering video may be a video obtained by tiling the virtual viewpoint video (RGB) and the virtual viewpoint video (Depth) together to be aggregated into one image, and may be a video in which an image such as an auxiliary video or a real camera image is further included in the one image. Details of the intermediate rendering video will be described below. The initial virtual viewpoint video generation unit 131 can correspond to one example of a second generation unit in the claims, for example.

(Transmission Unit 132 and Reception Unit 133)

The transmission unit 132 and the reception unit 133 are configurations for transmitting the intermediate rendering video generated by the initial virtual viewpoint video generation unit 131 to one or a plurality of final virtual viewpoint video generation units 134. The transmission of the intermediate rendering video via the transmission unit 132 and the reception unit 133 may be made over a predetermined network such as a LAN, a WAN, the Internet, or a mobile communication network, or may be made over a predetermined interface such as a high-definition multimedia interface (HDMI (registered trademark)) or a universal serial bus (USB). However, the transmission method is not limited thereto, and various communication means may be used.

(Final Virtual Viewpoint Video Generation Unit 134)

Based on the intermediate rendering video input from the initial virtual viewpoint video generation unit 131 via the transmission unit 132 and the reception unit 133 and based on the real camera viewpoint information shared by one or a plurality of the final virtual viewpoint video generation units 134, the final virtual viewpoint video generation unit 134 performs processing that has not been performed in the initial virtual viewpoint video generation unit 131, thereby generating video content to be finally presented to the user. For example, final virtual viewpoint video generation unit 134 performs processing such as superimposition of a background object or another 3D object on the volumetric video generated from a three-dimensional model, and image quality enhancement of the volumetric video. Furthermore, the final virtual viewpoint video generation unit 134 can also perform arrangement of a real camera image 33 with respect to the generated volumetric video, effect processing, and the like. The final virtual viewpoint video generation unit 134 can correspond to one example of a first generation unit in the claims, for example.

1-4-2. Specific Example of Intermediate Rendering Video

Figure 6:
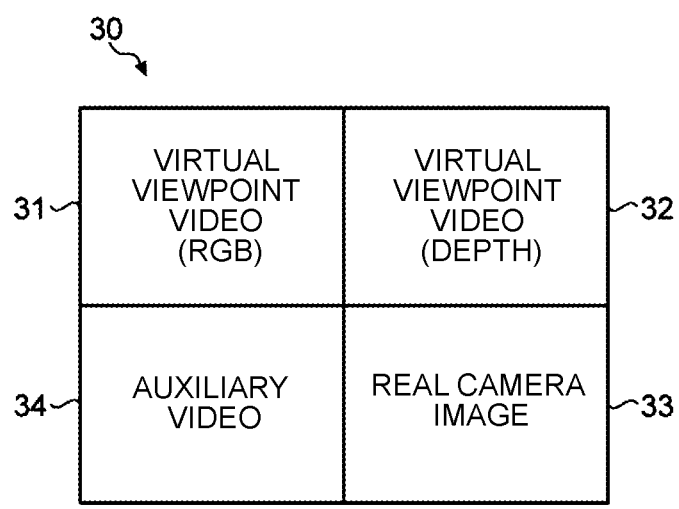
FIG. 6 is a diagram illustrating an example of an intermediate rendering video according to the present embodiment.

Here, a specific example of the intermediate rendering video will be described. FIG. 6 is a diagram illustrating an example of an intermediate rendering video according to the present embodiment. As illustrated in FIG. 6, an intermediate rendering video 30 has a configuration in which a virtual viewpoint video (RGB) 31, a virtual viewpoint video (depth) 32, a real camera image 33, and an auxiliary video 34 are combined (described as tiling in the present description) so as to form one piece of image data. The real camera image 33 and the auxiliary video 34 can each correspond to one example of a captured image in the claims, for example. However, the real camera image 33 and the auxiliary video 34 in the present embodiment, as well as the plurality of captured images in the claims, are not limited to the real camera image acquired by the real camera 70, and may be various types of video content and the like, such as a movie, a music video, a promotion video thereof, a video broadcasted on television, a video distributed on the internet, and a video shared in a video conference, regardless of the video captured online and the video created offline. Furthermore, the intermediate rendering video 30 can correspond to one example of a packed image in the claims, for example.

(Virtual Viewpoint Video (RGB) 31)

Figure 7:
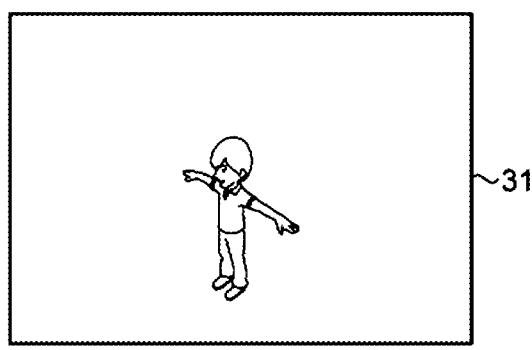
FIG. 7 is a diagram illustrating an example of a virtual viewpoint video (RGB) according to the present embodiment.

FIG. 7 is a diagram illustrating an example of a virtual viewpoint video (RGB) according to the present embodiment. As illustrated in FIG. 7, the virtual viewpoint video (RGB) 31 may be, for example, a volumetric video at a current point at which it is generated by rendering a three-dimensional model (three-dimensional shape mesh data and texture) from a virtual viewpoint based on virtual viewpoint information. In this case, the virtual viewpoint video (RGB) 31 can hold texture information obtained when the three-dimensional model is viewed from the virtual viewpoint. The virtual viewpoint video (RGB) 31 can correspond to one example of a first texture image in the claims, for example.

(Virtual Viewpoint Video (Depth) 32)

Figure 8:
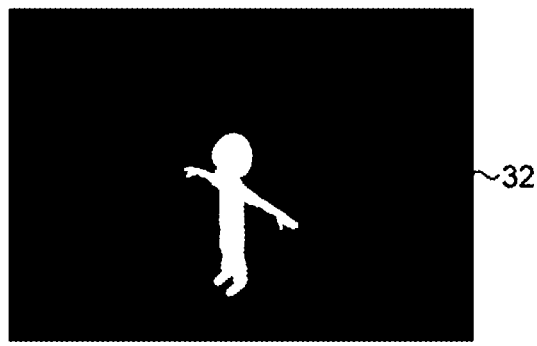
FIG. 8 is a diagram illustrating an example of a virtual viewpoint video (depth) according to the present embodiment.

FIG. 8 is a diagram illustrating an example of a virtual viewpoint video (depth) according to the present embodiment. As illustrated in FIG. 8, the virtual viewpoint video (depth) 32 may be image data indicating the depth of each pixel in the virtual viewpoint video (RGB) 31 from the virtual viewpoint, and may be a depth image generated by calculating the distance (depth information) from the virtual viewpoint position to each point in the three-dimensional shape mesh data. In that case, the virtual viewpoint video (depth) 32 can hold depth information from the virtual viewpoint to the three-dimensional model obtained when the three-dimensional model is viewed from the virtual viewpoint.

(Real Camera Image 33)

Figure 9:
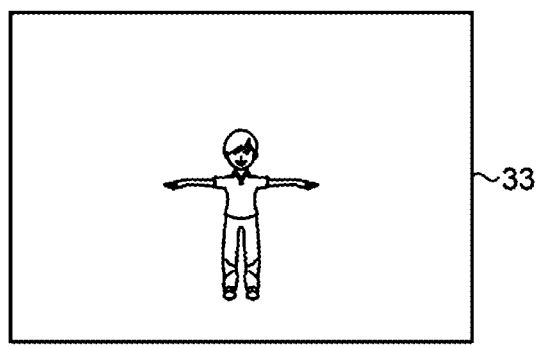
FIG. 9 is a diagram illustrating an example of a real camera image according to the present embodiment.

FIG. 9 is a diagram illustrating an example of a real camera image according to the present embodiment. As illustrated in FIG. 9, the real camera image 33 may be a real camera image captured by any one camera selected from the real cameras 70, for example. Note that the selection of one camera may be random selection, selection made on the content creator side, or may be selection made by the content viewer (user).

(Auxiliary Video 34)

Figure 10:
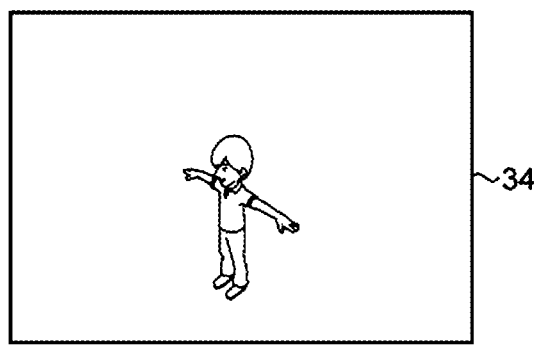
FIG. 10 is a view illustrating an example of an auxiliary video according to the present embodiment.

FIG. 10 is a diagram illustrating an example of an auxiliary video according to the present embodiment. As illustrated in FIG. 10, auxiliary video 34 is image data used to enhance the image quality of the volumetric video to be finally provided to the user, for example, and may be an image including the subject 90 captured from the same viewpoint as the virtual viewpoint and different from the virtual viewpoint video (RGB) 31, for example. The auxiliary video 34 may be a real camera image captured by any one camera selected from among the real cameras 70, for example. Similarly to the real camera image 33, the selection of an arbitrary one may be random selection, may be selection made on the content creator side, or may be selection made by the content viewer (user). However, the auxiliary video 34 may be omitted. Note that the auxiliary video 34 can correspond to one example of a second texture image in the claims, for example.

(Sharing Virtual Viewpoint)

In the present embodiment, the initial virtual viewpoint video generation unit 131 and the one or a plurality of final virtual viewpoint video generation units 134 share virtual viewpoint information (virtual viewpoint position and virtual viewpoint rotation information) in order to enable execution of processing based on the same virtual viewpoint. This enables the processing based on the same virtual viewpoint to be performed in the initial virtual viewpoint video generation unit 131 and/or each of the plurality of final virtual viewpoint video generation units 134, making it possible to perform operations such as distributed execution by a plurality of computers regarding each processing in the initial virtual viewpoint video generation unit 131 and/or each processing in the final virtual viewpoint video generation unit 134, and distributed arrangement of each of the plurality of final virtual viewpoint video generation units 134 in a plurality of computers to each generate a final volumetric video (corresponding to video content) to be provided to the user.

1-4-3. Further Detailed Configuration Example of Initial Virtual Viewpoint Video Generation Unit 131

Figure 11:
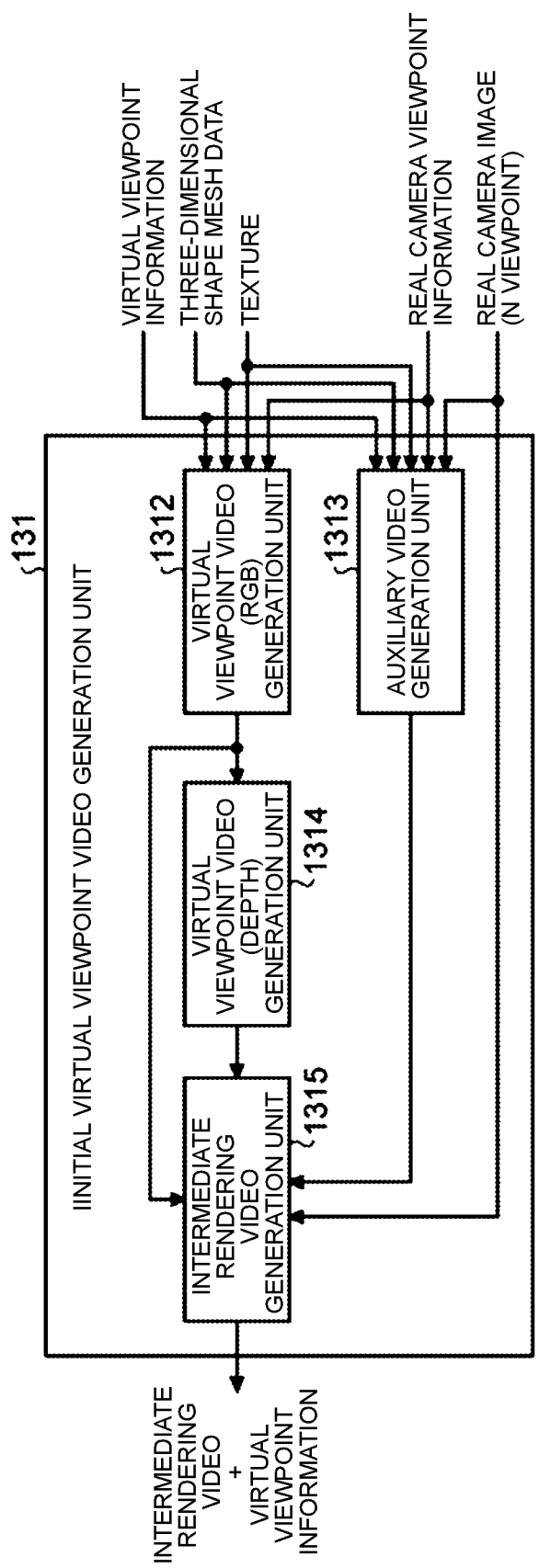
FIG. 11 is a block diagram illustrating a further detailed configuration example of an initial virtual viewpoint video generation unit according to the present embodiment.

Next, a further detailed configuration example of the initial virtual viewpoint video generation unit 131 will be described. FIG. 11 is a block diagram illustrating a further detailed configuration example of an initial virtual viewpoint video generation unit according to the present embodiment.

As illustrated in FIG. 11, the initial virtual viewpoint video generation unit 131 includes a virtual viewpoint video (RGB) generation unit 1312, an auxiliary video generation unit 1313, a virtual viewpoint video (depth) generation unit 1314, and an intermediate rendering video generation unit 1315.

The virtual viewpoint video (RGB) generation unit 1312 receives inputs of the three-dimensional shape mesh data, the texture, the virtual viewpoint information, and the real camera viewpoint information. The auxiliary video generation unit 1313 receives inputs of the three-dimensional shape mesh data, the texture, the virtual viewpoint information, the real camera viewpoint information, and the real camera image (N viewpoints). Note that the real camera image (N viewpoint) is also input to the intermediate rendering video generation unit 1315.

(Virtual Viewpoint Video (RGB) Generation Unit 1312)

As described above as the operation of the rendering unit 13, the virtual viewpoint video (RGB) generation unit 1312 projects three-dimensional shape mesh data from a virtual viewpoint, and performs texture mapping of applying a texture representing the color or pattern of the mesh onto the projected mesh shape. The virtual viewpoint video (RGB) 31 thus generated is each input to the virtual viewpoint video (depth) generation unit 1314 and the intermediate rendering video generation unit 1315.

(Auxiliary Video Generation Unit 1313)

The auxiliary video generation unit 1313 generates the auxiliary video 34 to be used for image quality enhancement performed by the final virtual viewpoint video generation unit 134 described below. Note that a real camera image acquired by any one or more of the real cameras 70 may be used as the auxiliary video 34.

(Virtual Viewpoint Video (Depth) Generation Unit 1314)

The virtual viewpoint video (depth) generation unit 1314 generates a virtual viewpoint video (depth) 31, which is a depth image, from the depth information of each point (corresponding to a pixel) on a three-dimensional model determined when the virtual viewpoint video (RGB) generation unit 1312 generated the virtual viewpoint video (RGB) 32. The generated virtual viewpoint video (depth) 32 is input to the intermediate rendering video generation unit 1315.

Note that, in a case where the virtual viewpoint video (RGB) generation unit 1312 determines the depth information in an absolute value (mm, etc.), the virtual viewpoint video (depth) generation unit 1314 may generate the virtual viewpoint video (depth) 32 by quantizing the depth information of each pixel. For example, in a case where the bit depth of other image data such as the virtual viewpoint video (RGB) 31 is 8 bits, the virtual viewpoint video (depth) generation unit 1314 may quantize the depth information (mm or the like) of each pixel into depth information of 256 gradations of "0" to "255". This eliminates the necessity to increase the bit depth of the intermediate rendering video, making it possible to suppress an increase in the data volume to be transmitted.

(Intermediate Rendering Video Generation Unit 1315)

The intermediate rendering video generation unit 1315 tiles the virtual viewpoint video (RGB) 31 input from the virtual viewpoint video (RGB) generation unit 1312, the virtual viewpoint video (depth) 32 input from the virtual viewpoint video (depth) generation unit 1314, the real camera image (N viewpoint) 33 directly input, and the auxiliary video 34 input from the auxiliary video generation unit 1313, in a predetermined arrangement, thereby generating one intermediate rendering video 30 (refer to FIG. 6).

The generated intermediate rendering video 30 is output to the transmission unit 132 in the rendering unit 13.

1-4-4. Further Detailed Configuration Example of Final Virtual Viewpoint Video Generation Unit 134

Figure 12:
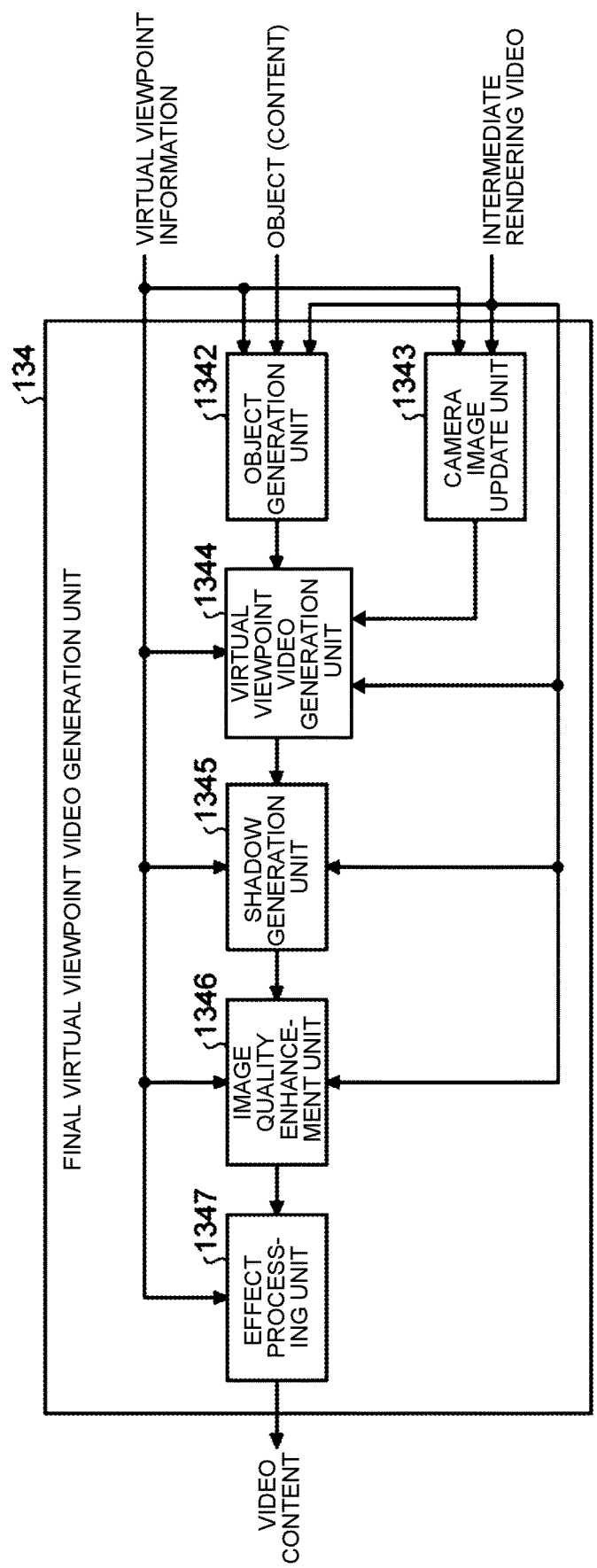
FIG. 12 is a block diagram illustrating a further detailed configuration example of a final virtual viewpoint video generation unit according to the present embodiment.

Next, a further detailed configuration example of the final virtual viewpoint video generation unit 134 will be described. FIG. 12 is a block diagram illustrating a further detailed configuration example of a final virtual viewpoint video generation unit according to the present embodiment. As illustrated in FIG. 12, the final virtual viewpoint video generation unit 134 includes an object generation unit 1342, a camera image update unit 1343, a virtual viewpoint video generation unit 1344, a shadow generation unit 1345, an image quality enhancement unit 1346, and an effect processing unit 1347.

The object generation unit 1342 receives inputs of object (content) to be superimposed on the three-dimensional model and virtual viewpoint information. The camera image update unit 1343 receives inputs of the intermediate rendering video 30 and the virtual viewpoint information. Note that the intermediate rendering video 30 is also input to the virtual viewpoint video generation unit 1344, the shadow generation unit 1345, and the image quality enhancement unit 1346. Furthermore, the virtual viewpoint information may also be input to the virtual viewpoint video generation unit 1344, the shadow generation unit 1345, the image quality enhancement unit 1346, and the effect processing unit 1347.

(Object Generation Unit 1342)

The object generation unit 1342 generates a three-dimensional object, a background object, and the like (hereinafter, referred to as an additional object) to be superimposed on the volumetric video to be provided to the user by using the input object (content). The generated additional object is input to the virtual viewpoint video generation unit 1344.

(Camera Image Update Unit 1343)

The camera image update unit 1343 extracts the real camera image 33 from the intermediate rendering video 30. Note that the real camera image 33 incorporated in the intermediate rendering video 30 may be a real camera image synchronized with, that is, temporally corresponding to the virtual viewpoint video (RGB). In other words, the real camera image 33 may be a two-dimensional image including the subject 90 temporally corresponding to the subject 90 used for generating the three-dimensional model. The extracted real camera image 33 is input to the virtual viewpoint video generation unit 1344.

(Virtual Viewpoint Video Generation Unit 1344)

The virtual viewpoint video generation unit 1344 extracts the virtual viewpoint video (RGB) 31 and the virtual viewpoint video (depth) 32 from the intermediate rendering video 30, and reconstructs the three-dimensional model using the extracted virtual viewpoint video (RGB) 31 and virtual viewpoint video (depth) 32. Furthermore, the virtual viewpoint video generation unit 1344 superimposes the additional object input from the object generation unit 1342 on the reconstructed three-dimensional model as necessary. That is, the virtual viewpoint video generation unit 1344 arranges the three-dimensional model and the additional object in a same virtual space. At that time, the virtual viewpoint video generation unit 1344 may adjust the positional relationship between the three-dimensional model and the additional object based on the depth information of the additional object with respect to the virtual viewpoint and based on the virtual viewpoint video (depth) 32, for example.

The virtual viewpoint video generation unit 1344 then generates a volumetric video of the three-dimensional model (and the additional object) by rendering the reconstructed three-dimensional model (and the additional object) using the virtual viewpoint based on the virtual viewpoint information (the virtual viewpoint position and the virtual viewpoint rotation information).

In addition, the virtual viewpoint video generation unit 1344 generates a piece of video content by superimposing the real camera image 33 input from the camera image update unit 1343 on a predetermined region of the generated volumetric video. The video content thus generated is, for example, a video in which a subject generated from a three-dimensional model and a subject based on the real camera image 33 are simultaneously present, and can correspond to one example of a video in the claims.

However, the content generation is not limited thereto, and the virtual viewpoint video generation unit 1344 may directly generate the video content by arranging the real camera image 33 on a plane within the virtual space in which the three-dimensional model (and the additional object) is disposed and by rendering the three-dimensional model (and the additional object) and the real camera image 33 using the virtual viewpoint. The combined model of the three-dimensional model (and the additional object) and the real camera image 33 generated at that time can correspond to one example of a combined three-dimensional model in the claims.

The video content generated in this manner is input to the shadow generation unit 1345.

(Shadow Generation Unit 1345)

The shadow generation unit 1345 applies a shadow to an object included in the volumetric video in the input video content. Consequently, it is possible to enhance reality of the volumetric video. However, in a case where no shadow is applied, the shadow generation unit 1345 may be omitted or invalidated. For example, the shadow generation unit 1345 applies a shadow to the three-dimensional model and the image of the additional object based on the virtual viewpoint video (depth) 32 included in the intermediate rendering video 30, the depth information of the additional object generated when the object generation unit 1342 generated the additional object, and the like. The video content in which the shadow is added to the object is input to the image quality enhancement unit 1346.

Note that the shadow generation unit 1345 also receives inputs of information regarding the position and type (hue and the like) of the light source used for generating the shadow (hereinafter, referred to as light source information). For example, the light source information may be included in the virtual viewpoint information, or may be separately input to the shadow generation unit 1345.

(Image Quality Enhancement Unit 1346)

The image quality enhancement unit 1346 executes processing of enhancing the image quality of the input video content. For example, the image quality enhancement unit 1346 executes processing such as contour blurring processing, alpha blending processing, and noise removal processing, on a three-dimensional model, an image of an additional object, and the like included in the volumetric video of certain video content, thereby suppressing time-series fluctuations occurring in the volumetric video. At that time, the image quality enhancement unit 1346 may use the auxiliary video 34 included in the intermediate rendering video 30 for the above processing.

Figure 13:
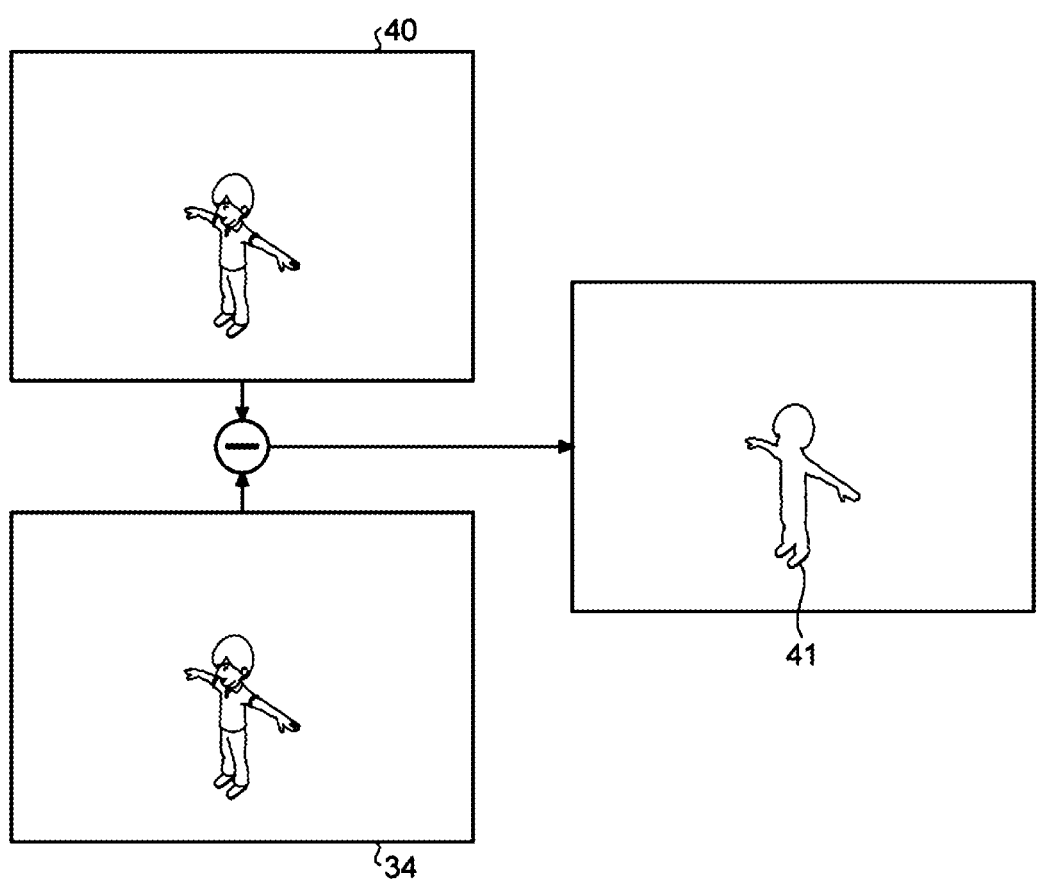
FIG. 13 is a diagram illustrating an example of processing executed by an image quality enhancement unit according to the present embodiment.

The image quality enhancement unit 1346 removes the color of a green screen at the time of rendering so that the color of the green screen does not remain in the contour of the three-dimensional model. In the present description, the video before the removal is referred to as the auxiliary video 34. For example, as illustrated in FIG. 13, the image quality enhancement unit 1346 may calculate a difference between the auxiliary video 34 and a volumetric video 40 generated by the virtual viewpoint video generation unit 1344 to extract a contour 41 of an image of the three-dimensional model (and the additional object) included in the volumetric video 40, and may then execute blur processing, alpha blending processing, noise removal processing, and the like on the volumetric video based on the contour 41 extracted. At this point, the image quality enhancement unit 1346 may adjust the scale, the inclination, the color, and the like of the volumetric video 40 and/or the auxiliary video 34 in order to achieve near-perfect match between the image of the three-dimensional model included in the volumetric video 40 with the image of the subject 90 included in the auxiliary video 34.

(Effect Processing Unit 1347)

The effect processing unit 1347 can execute various effect processing on the video content. For example, the effect processing unit 1347 executes effect processing including application of an effect such as an aura effect on an image of a three-dimensional model or an additional object, an effect such as mosaic to the real camera image 33, and a petals falling effect as a background. This makes it possible to expand the range of renditions. Note that in a case where no effect is applied, the effect processing unit 1347 may be omitted or invalidated. Subsequently, the effect processing unit 1347 outputs the video content to which the effect is applied as necessary to the transmission unit 14 as final video content to be distributed to the user. Consequently, the final video content transmitted from transmission unit 14 is received by the reception unit of the user terminal, and displayed on the display unit 16 of the user terminal.

1-5. Examples of Renditions According to Present Embodiment

Figure 14:
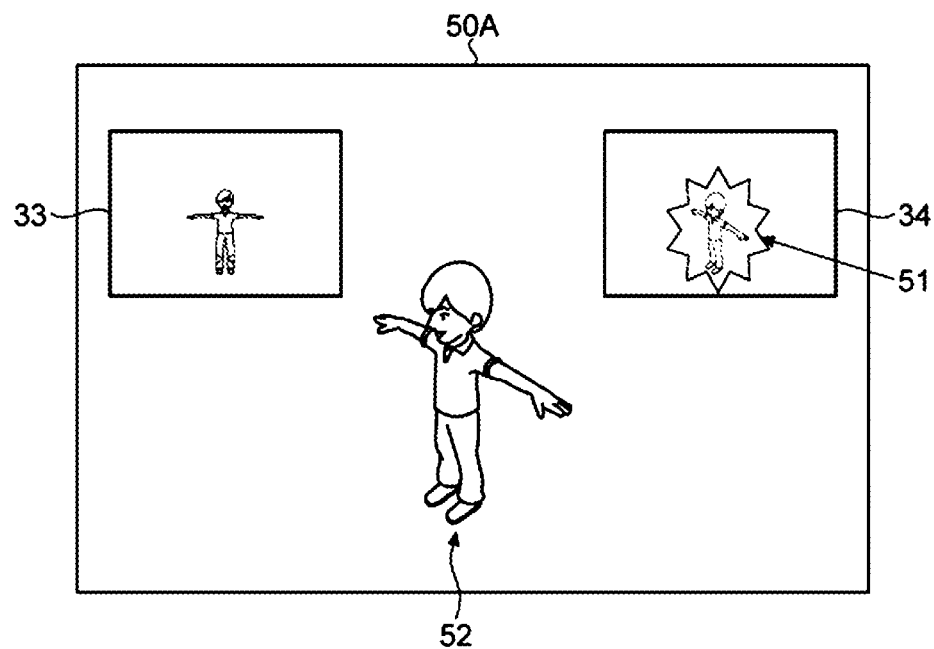
FIG. 14 is a diagram illustrating an example of video content distributed to a user in the present embodiment.

FIG. 14 is a diagram illustrating an example of video content distributed to the user in the present embodiment. In a piece of video content 50A illustrated in FIG. 14, a real camera image 33 synchronized with (temporally corresponding to) a volumetric video including image 52 of the three-dimensional model is superimposed on the volumetric video. Furthermore, in the video content 50A according to the present embodiment, the auxiliary video 34 synchronized with (temporally corresponding to) the volumetric video is also superimposed. The auxiliary video 34 has undergone an effect 51 being an aura effect that allows the displayed subject 90 to look like it is giving off an aura.

Figure 15:
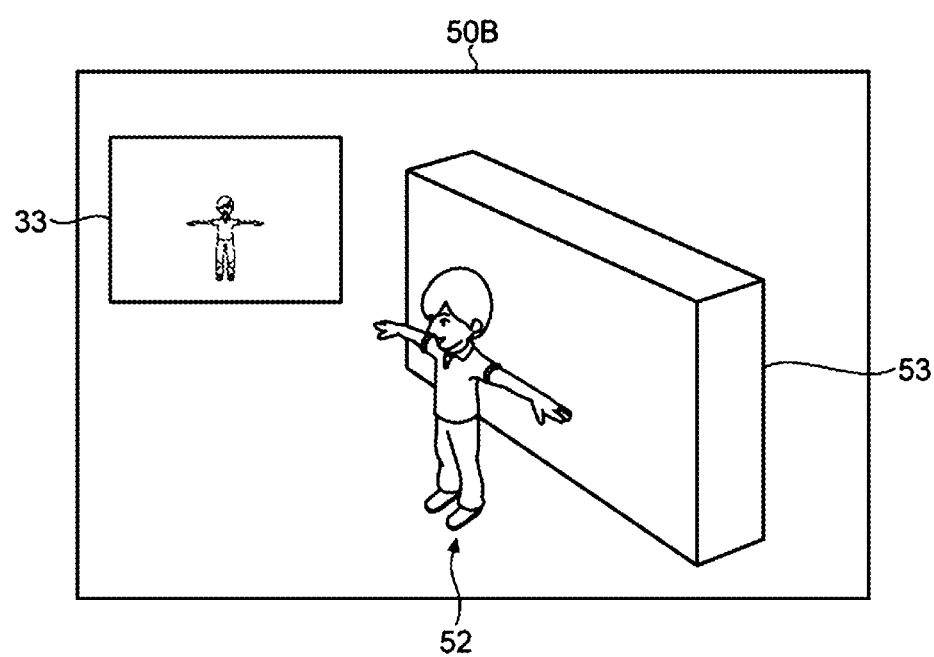
FIG. 15 is a view illustrating another example of a volumetric video distributed to the user in the present embodiment.

FIG. 15 is a view illustrating another example of the volumetric video to be distributed to the user in the present embodiment. In a piece of video content 50B illustrated in FIG. 15, an image 53 of the background object is superimposed on the image 52 of the three-dimensional model. That is, the volumetric video is generated in a state where the background object is disposed in the virtual space in which the three-dimensional model is disposed. Also in FIG. 15, a real camera image 33 synchronized with (temporally corresponding to) the volumetric video is superimposed on the volumetric video.

In this manner, the present embodiment enables another video to be superimposed on the volumetric video, making it possible to expand the range of renditions in the video content provided to the user. Note that the video to be superimposed on the volumetric video is not limited to the real camera image 33 (including the real camera image by the auxiliary video 34), and may be various image data separately prepared, such as a promotion video, an animation, or one scene of a movie.

In addition, according to the present embodiment, various effects can be applied to the volumetric video and the image data superimposed on the volumetric video. This makes it possible to further expand the range of renditions in the video content to be provided to the user.

Furthermore, according to the present embodiment, it is possible to perform a presentation display in which another three-dimensional object, a background object, or the like is superimposed on the volumetric video. This makes it possible to further expand the range of renditions in the video content to be provided to the user.

Note that the image data and the additional object superimposed on the volumetric video may be configured to be switched automatically or at any timing based on a user operation.

1-6. Specific Example of Information Processing System

Figure 16:
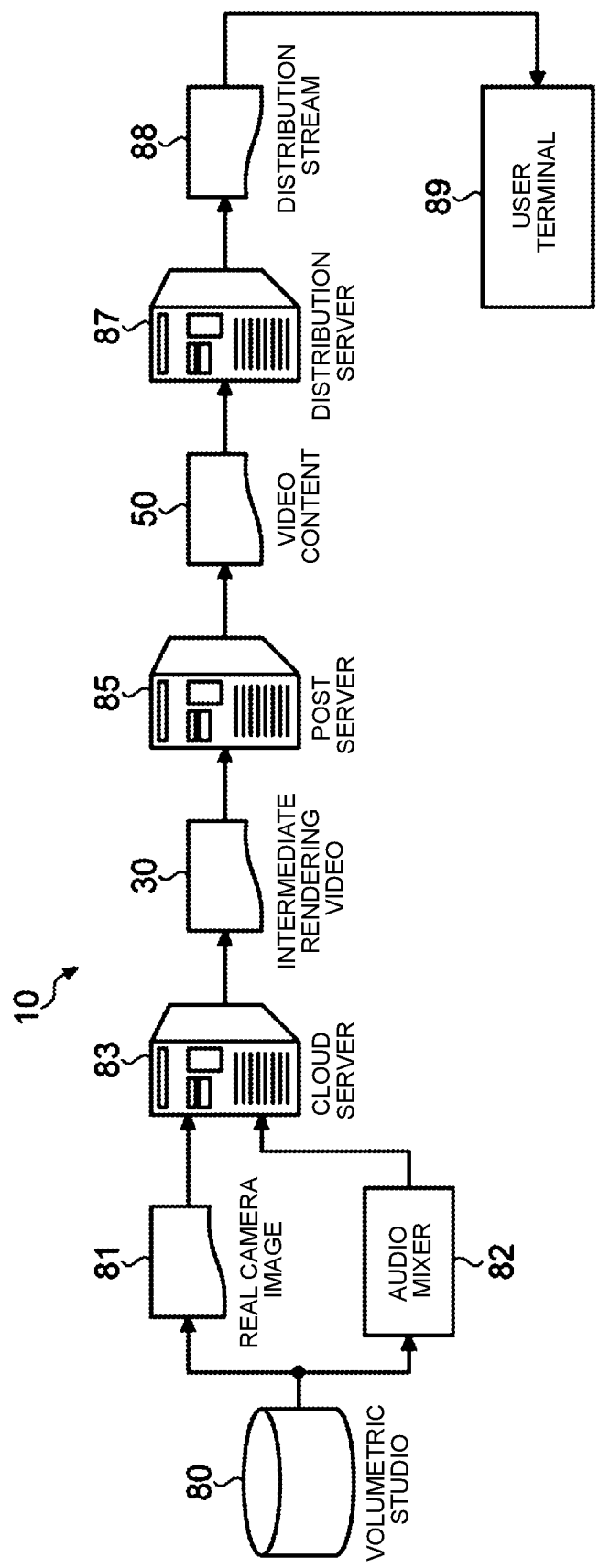
FIG. 16 is a system configuration diagram illustrating a specific example of the information processing system according to the present embodiment.

Next, a specific example of the information processing system 10 according to the present embodiment will be described. FIG. 16 is a system configuration diagram illustrating a specific example of the information processing system according to the present embodiment. As illustrated in FIG. 16, the information processing system 10 includes a cloud server 83, a post server 85, a distribution server 87, and a user terminal 89. The user terminal 89 need not be included in the information processing system 10.

A real camera image 81 for generating the volumetric video is acquired by capturing the subject 90 with one or more real cameras 70 (refer to FIG. 2) installed in a volumetric studio 80, for example. At that time, audio data based on a sound signal recorded together with the real camera image 81 may be generated by an audio mixer 82. The volumetric studio 80 may be indoors or outdoors as long as it is an environment capable of imaging the subject 90 in one direction or multiple directions.

The real camera image 81 acquired by the real camera 70 and the audio data generated by the audio mixer 82 are input to the cloud server 83 disposed on a predetermined network. The cloud server 83 includes, for example, the data acquisition unit 11, the 3D model generation unit 12, and a part of the rendering unit 13, namely, the initial virtual viewpoint video generation unit 131 and the transmission unit 132, of the configuration illustrated in FIG. 1.

By using the 3D model generation unit 12, the cloud server 83 generates a three-dimensional model of the subject 90 from the real camera image 81 acquired by the data acquisition unit 11. Then, the cloud server 83 generates the virtual viewpoint video (RGB) 31 and the virtual viewpoint video (depth) 32 from the three-dimensional model in the initial virtual viewpoint video generation unit 131 of the rendering unit 13, and generates the intermediate rendering video 30 from the generated virtual viewpoint video (RGB) 31 and virtual viewpoint video (depth) 32 and from the input real camera image 81 (corresponding to the real camera image 33 and the auxiliary video 34).

Note that the cloud server 83 is merely an example, and may be implemented by using various information processing devices disposed on a network, such as a fog server and an edge server.

The generated intermediate rendering video 30 is transmitted from the transmission unit 132 of the rendering unit 13 to the post server 85 via a predetermined network. The post server 85 includes, for example, the reception unit 133 and the final virtual viewpoint video generation unit 134 out of the rendering unit 13.

The post server 85 extracts the virtual viewpoint video (RGB) 31, the virtual viewpoint video (depth), the real camera image 33, and the auxiliary video 34 from the intermediate rendering video 30, and generates a video content 50 to be finally presented to the user based on these videos. The specific operation may be similar to that of the final virtual viewpoint video generation unit 134 described above.

The video content 50 generated in this manner is converted into a distribution stream 88 corresponding to each user terminal 89 in the distribution server 87 in which the transmission unit 14 is disposed, and then distributed from the distribution server 87 to the user terminal 89 via a predetermined network. In response to this, the user terminal 89 receives the distributed distribution stream 88 by the reception unit 15, and restores the video content from the distribution stream 88. The user terminal 89 then displays the restored video content 50 on the display unit 16 toward the user.

1-7. Summary

As described above, according to the present embodiment, it is possible to display the real camera image 33 (including a see-through video, a video with effects, etc.) so as to be synchronized with and superimposed on the volumetric video 40. Furthermore, it is possible to display the background object in presentation in contrast to the volumetric video 40. This makes it possible to greatly expand the range of renditions when the volumetric video is distributed in real time.

Furthermore, in the present embodiment, the three-dimensional data is converted into the intermediate rendering video 30 that is two-dimensional image data in the course of the processing executed by the rendering unit 13. This enables the data for generating the volumetric video to be transferred by HDMI (registered trademark) capture or codec compression, making it possible to have lower traffic at the time of transmission to shorten the data transmission time. As a result, it is possible to improve the real-time property in the distribution of the video content including the volumetric video.

Furthermore, by sharing the virtual viewpoint information among a plurality of computers and distributing the intermediate rendering video 30 to each computer, it is possible to execute processing (for example, virtual viewpoint video generation, shadow generation, image quality enhancement, effect processing, and the like) related to generation of the volumetric video by using distributed processing on a plurality of computers. This makes it possible to reduce the load on each computer. In addition, the processing related to the generation of the volumetric video can be flexibly assigned to the computer suitable for each processing, making it possible to further reduce the load on each computer. For example, it is possible to perform job allocation such that generation of the virtual viewpoint video (RGB) 31 and the virtual viewpoint video (depth) 32 is to be executed by a computer incorporating Linux (registered trademark) capable of performing GPU distribution processing while subsequent processing such as shadow application, image quality enhancement, and effect processing are to be executed by a computer equipped with an operating system (OS) capable of using a library suitable for implementation of the processing with no difficulty. As a result, the overall processing time can be shortened by efficiently executing each processing, making it possible to improve the real-time property in the distribution of the video content including the volumetric video.

For example, the program for implementing each unit (each processing) described in the above-described embodiments may be executed on a certain device. In that case, there would be no problem as long as the device has necessary functional blocks and can obtain necessary information.

Furthermore, for example, each step of one flowchart may be executed by one device, or may be shared and executed by a plurality of devices. Furthermore, in a case where a plurality of processes is included in one step, the plurality of processes may be executed by one device, or may be shared and executed by a plurality of devices. In other words, a plurality of processes included in one step can also be executed as processes of a plurality of steps. Conversely, the processing described as a plurality of steps can be collectively executed as one step.

Furthermore, regarding the program executed by the computer, for example, processing of steps describing the program may be executed in time series in the order described in the present specification, or may be executed in parallel or individually at necessary timing such as when a call is made. That is, as long as there is no contradiction, the processing of each step may be executed in an order different from the above-described order. Furthermore, the processing of steps describing this program may be executed in parallel with the processing of another program, or may be executed in combination with the processing of another program.

Furthermore, for example, a plurality of techniques related to the present technology can be independently implemented alone as long as there is no contradiction. Naturally, a plurality of any of present technology can be implemented in combination. For example, some or all of the present technology described in any of the embodiments can be implemented in combination with some or all of the present technology described in other embodiments. Furthermore, some or all of the above-described arbitrary present technology can be implemented in combination with other technologies not described above.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technique can also have the following configurations.

(1)

An information processing device including a first generation unit that performs, based on a three-dimensional model of a subject generated by using a plurality of captured images obtained by imaging the subject and based on a two-dimensional image, generation of a video in which the subject generated from the three-dimensional model, and the two-dimensional image, are simultaneously present.

(2)

The information processing device according to (1),
wherein the two-dimensional image is a two-dimensional image that uses at least one captured video out of the plurality of captured images used to generate the three-dimensional model of the subject, and
the first generation unit generates the video in which the subject generated from the three-dimensional model, and a subject based on the two-dimensional image corresponding to the subject, are simultaneously present.

(3)

The information processing device according to (2),
wherein the first generation unit generates the video based on a three-dimensional model of the subject and based on the two-dimensional image including the subject temporally corresponding to the subject used to generate the three-dimensional model.

(4)

The information processing device according to any one of (1) to (3), further including
a second generation unit that generates a packed image in which a texture image obtained by converting the three-dimensional model of the subject into two-dimensional texture information based on a virtual viewpoint set in a virtual space in which the three-dimensional model is disposed, and a depth image obtained by converting depth information from the virtual viewpoint to the three-dimensional model of the subject into a two-dimensional image, are packed in one frame.

(5)

The information processing device according to (4),
wherein the packed image further includes at least one of the plurality of captured images.

(6)

The information processing device according to (5),
wherein the texture image and the captured image included in the packed image are images temporally corresponding to each other.

(7)

The information processing device according to any one of (4) to (6),
wherein the texture image included in the packed image includes: a first texture image obtained by converting the three-dimensional model of the subject into the two-dimensional texture information based on the virtual viewpoint set in the virtual space in which the three-dimensional model is disposed; and a second texture image including the subject from the same viewpoint as the virtual viewpoint, and being an image different from the first texture image.

(8)

The information processing device according to any one of (4) to (7), further including
a transmission unit that transmits the packed image; and
a reception unit that receives the packed image from the transmission unit,
wherein the first generation unit reconstructs the three-dimensional model based on the packed image received by the reception unit, renders the three-dimensional model at the virtual viewpoint set in the virtual space in which the three-dimensional model is disposed, and by the operations of reconstruction and rendering, the first generation unit generates a two-dimensional image including a subject generated from the three-dimensional model, and generates the video using the two-dimensional image.

(9)

The information processing device according to any one of (4) to (8), further including
a plurality of the first generation units,
wherein each of the first generation units generates the video by using the three-dimensional model reconstructed from the packed image acquired from the second generation unit.

(10)

The information processing device according to any one of (1) to (9), further including
a shadow generation unit that applies a shadow to a region of the subject included in the video.

(11)

The information processing device according to any one of (1) to (10), further including
an image quality enhancement unit that enhances image quality of the video by using at least one captured image among the plurality of captured images.

(12)

The information processing device according to any one of (1) to (11), further including
an effect processing unit that performs effect processing on the video.

(13)

The information processing device according to any one of (1) to (12), further including
a transmission unit that transmits the video generated by the first generation unit to one or more user terminals via a predetermined network.

(14)

The information processing device according to any one of (1) to (13),
wherein the first generation unit disposes a three-dimensional model of the subject generated using the plurality of captured images obtained by imaging the subject in a three-dimensional space, and arranges a two-dimensional image based on at least one image of the plurality of captured images in the three-dimensional space, and by this arrangement, the first generation unit generates a combined three-dimensional model including the three-dimensional model and the two-dimensional image.

(15)

The information processing device according to (14),
wherein the first generation unit generates the video by rendering the combined three-dimensional model based on a virtual viewpoint set in a virtual space in which the three-dimensional model is disposed.

(16)

An information processing method including generating, by using a computer, based on a three-dimensional model of a subject generated by using a plurality of captured images obtained by imaging the subject and based on a two-dimensional image, a video in which a subject generated from the three-dimensional model, and the two-dimensional image, are simultaneously present.

(17)

A video distribution method including:
generating a three-dimensional model of a subject by using a plurality of captured images obtained by imaging the subject;

generating a video in which a subject generated from the three-dimensional model and a two-dimensional image are simultaneously present based on the three-dimensional model of the subject and the two-dimensional image; and distributing the video to a user terminal via a predetermined network.

(18)
An information processing system including:
an imaging device that images a subject to generate a plurality of captured images of the subject;
an information processing device that generates a video in which a subject generated from a three-dimensional model generated by using the plurality of captured images and a two-dimensional image are simultaneously present based on the three-dimensional model of the subject and the two-dimensional image; and
a user terminal that displays the video generated by the information processing device to a user.

REFERENCE SIGNS LIST

10 INFORMATION PROCESSING SYSTEM
11 DATA ACQUISITION UNIT
12 3D MODEL GENERATION UNIT
13 RENDERING UNIT
14 TRANSMISSION UNIT
15 RECEPTION UNIT
16 DISPLAY UNIT
20 DRIVE
21 CPU
22 ROM
23 RAM
24 BUS
25 INPUT/OUTPUT INTERFACE
26 INPUT UNIT
27 OUTPUT UNIT
28 STORAGE UNIT
29 COMMUNICATION UNIT
30 INTERMEDIATE RENDERING VIDEO
31 VIRTUAL VIEWPOINT VIDEO (RGB)
32 VIRTUAL VIEWPOINT VIDEO (DEPTH)
33, 81 REAL CAMERA IMAGE
34 AUXILIARY VIDEO
40 VOLUMETRIC VIDEO
41 CONTOUR
50, 50A, 50B VIDEO CONTENT
51 EFFECTS
52 IMAGE OF THREE-DIMENSIONAL MODEL
53 IMAGE OF BACKGROUND OBJECT
70, 70a, 70b, 70c, 70d, 70e, ... REAL CAMERA
80 VOLUMETRIC STUDIO
82 AUDIO MIXER
83 CLOUD SERVER
85 POST SERVER
87 DISTRIBUTION SERVER
88 DISTRIBUTION STREAM
89 USER TERMINAL
90 SUBJECT
131 INITIAL VIRTUAL VIEWPOINT VIDEO GENERATION UNIT
132 TRANSMISSION UNIT
133 RECEPTION UNIT
134 FINAL VIRTUAL VIEWPOINT VIDEO GENERATION UNIT
1312 VIRTUAL VIEWPOINT VIDEO (RGB) GENERATION UNIT
1313 AUXILIARY VIDEO GENERATION UNIT
1314 VIRTUAL VIEWPOINT VIDEO (DEPTH) GENERATION UNIT
1315 INTERMEDIATE RENDERING VIDEO GENERATION UNIT
1342 OBJECT GENERATION UNIT
1343 CAMERA IMAGE UPDATE UNIT
1344 VIRTUAL VIEWPOINT VIDEO GENERATION UNIT
1345 SHADOW GENERATION UNIT
1346 IMAGE QUALITY ENHANCEMENT UNIT
1347 EFFECT PROCESSING UNIT

The invention claimed is:

1. An information processing device comprising:
circuitry configured to
receive, based on a three-dimensional model of a subject generated by using a plurality of captured images obtained by imaging the subject, a packed image including
a texture image obtained by converting three-dimensional texture information based on a virtual viewpoint set in a virtual space in which the three-dimensional model is disposed, and
a depth image obtained by converting depth information from the virtual viewpoint to the three-dimensional model of the subject into a two-dimensional image, and
generate a video in which the subject generated from the three-dimensional model, and generated from the two-dimensional image, are simultaneously present,
wherein the texture image and the depth image are packed in one frame of the packed image.

2. The information processing device according to claim 1,
wherein the two-dimensional image uses at least one captured video out of the plurality of captured images used to generate the three-dimensional model of the subject.

3. The information processing device according to claim 2,
wherein the circuitry generates the video based on the three-dimensional model of the subject and based on the two-dimensional image including the subject temporally corresponding to the subject used to generate the three-dimensional model.

4. The information processing device according to claim 1,
wherein the packed image further includes at least one of the plurality of captured images.

5. The information processing device according to claim 4,
wherein the texture image and the captured image included in the one frame of the packed image temporally correspond to each other.

6. The information processing device according to claim 1,
wherein the texture image included in the packed image includes:
a first texture image obtained by converting the three-dimensional model of the subject into the two-dimensional texture information based on the virtual viewpoint set in the virtual space in which the three-dimensional model is disposed; and
a second texture image including the subject from a same viewpoint as the virtual viewpoint, the second texture image being different from the first texture image.

7. The information processing device according to claim 1,
wherein the circuitry is further configured to
reconstruct the three-dimensional model based on the received packed image,
render the three-dimensional model at the virtual viewpoint set in the virtual space in which the three-dimensional model is disposed, and
generate, by the reconstruction and rendering, the two-dimensional image including the subject generated from the three-dimensional model.

8. The information processing device according to claim 1,
wherein the circuitry generates the video by using the three-dimensional model reconstructed from the received packed image.

9. The information processing device according to claim 1,
wherein the circuitry is further configured to apply a shadow to a region of the subject included in the video.

10. The information processing device according to claim 1,
wherein the circuitry is further configured to enhance image quality of the video by using at least one captured image among the plurality of captured images.

11. The information processing device according to claim 1,
wherein the circuitry is further configured to perform effect processing on the video.

12. The information processing device according to claim 1,
wherein the circuitry is further configured to transmit the video to one or more user terminals via a predetermined network.

13. The information processing device according to claim 1,
wherein the circuitry is further configured to
dispose the three-dimensional model of the subject generated using the plurality of captured images obtained by imaging the subject in a three-dimensional space, and
arrange the two-dimensional image based on at least one image of the plurality of captured images in the three-dimensional space, and
wherein, by the arrangement of the two-dimensional image, the circuitry generates the video including a combined three-dimensional model including the three-dimensional model and the two-dimensional image.

14. The information processing device according to claim 13,
wherein the circuitry generates the video by rendering the combined three-dimensional model based on the virtual viewpoint set in the virtual space in which the three-dimensional model is disposed.

15. An information processing method comprising:
receiving, by using a computer, based on a three-dimensional model of a subject generated by using a plurality of captured images obtained by imaging the subject, a packed image including
a texture image obtained by converting three-dimensional texture information based on a virtual viewpoint set in a virtual space in which the three-dimensional model is disposed, and
a depth image obtained by converting depth information from the virtual viewpoint to the three-dimensional model of the subject into a two-dimensional image; and
generating a video in which the subject generated from the three-dimensional model, and generated from the two-dimensional image, are simultaneously present.

16. A video distribution method comprising:
receiving, based on a three-dimensional model of a subject generated by using a plurality of captured images obtained by imaging the subject, a packed image including
a texture image obtained by converting three-dimensional texture information based on a virtual viewpoint set in a virtual space in which the three-dimensional model is disposed, and
a depth image obtained by converting depth information from the virtual viewpoint to the three-dimensional model of the subject into a two-dimensional image;
generating a video in which the subject generated from the three-dimensional model, and generated from the two-dimensional image, are simultaneously present; and
distributing the video to a user terminal via a predetermined network.

17. An information processing system comprising:
an imaging device configured to image a subject to generate a plurality of captured images of the subject;
an information processing device configured to
receive, based on a three-dimensional model of a subject generated by using a plurality of captured images obtained by imaging the subject, a packed image including
a texture image obtained by converting three-dimensional texture information based on a virtual viewpoint set in a virtual space in which the three-dimensional model is disposed, and
a depth image obtained by converting depth information from the virtual viewpoint to the three-dimensional model of the subject into a two-dimensional image, and
generate a video in which the subject generated from the three-dimensional model generated by using the plurality of captured images, and generated from the two-dimensional image, are simultaneously present; and
a user terminal configured to display the video generated by the information processing device to a user.

* * * * *